W. M. CASWELL & J. A. SCHOFIELD.
TROLLEY WHEEL BEARING.
APPLICATION FILED DEC. 16, 1907.
901,878.
Patented Oct. 20, 1908.
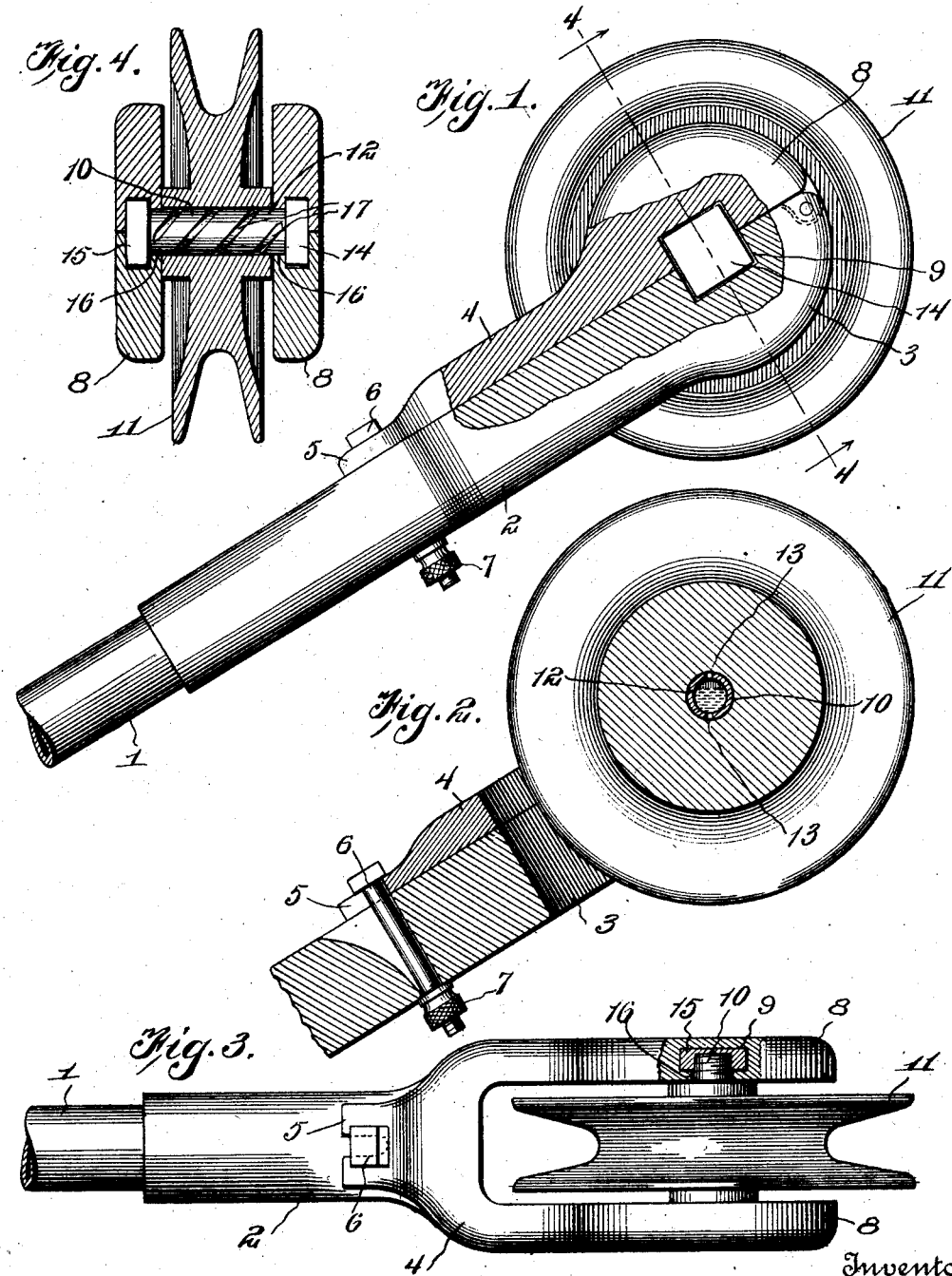
Witnesses
Louis R. Heinrichs
L. O. Hilton
Inventors
William M. Caswell
Joseph A. Schofield
By H. B. Willson & Co.
Attorneys

UNITED STATES PATENT OFFICE.

WILLIAM M. CASWELL AND JOSEPH A. SCHOFIELD, OF WARREN, PENNSYLVANIA.

TROLLEY-WHEEL BEARING.

No. 901,878.   Specification of Letters Patent.   Patented Oct. 20, 1908.

Application filed December 16, 1907. Serial No. 406,749.

*To all whom it may concern:*

Be it known that we, WILLIAM M. CASWELL and JOSEPH A. SCHOFIELD, citizens of the United States, residing at Warren, in the county of Warren and State of Pennsylvania, have invented certain new and useful Improvements in Trolley-Wheel Bearings; and we do declare the following to be a full, clear, and exact description of the invention, such as will enable others skilled in the art to which it appertains to make and use the same.

This invention relates to new and useful improvements in wheel bearings, and while it is primarily designed as a bearing for trolley wheels, it may be used as a bearing for wagon wheels, car wheels, pulleys, or the like.

One of the objects of the invention is to provide a bearing of such construction as to permit of the wearing parts of the same being readily removed and replaced when worn out or broken.

A further object of the invention is to provide means for oiling the trolley wheel and for permitting the receptacle for the oil or other lubricant being refilled when its contents have been consumed.

With the foregoing and other objects in view, the invention consists of certain novel features of construction, combination and arrangement of parts, as will be more fully described and particularly pointed out in the appended claims.

In the accompanying drawings: Figure 1 is a view in side elevation of the bearing constructed in accordance with the invention, parts broken away. Fig. 2 is a longitudinal sectional view of Fig. 1. Fig. 3 is a plan view, parts broken away, to more advantageously illustrate certain features of the invention; and Fig. 4 is a cross sectional view taken on the plane indicated by the dotted lines 4—4 of Fig. 1.

Referring to the drawings which are for illustrative purposes only, and therefore not drawn to scale, the numeral 1 indicates the trolley pole and 2 the trolley pole harp or fork, the same being formed of two sections, a fixed and hinged section 3 and 4, respectively, the former being formed by an extension or prolongation of the trolley pole, and the latter being hingedly connected at its outer end with the fixed or other section.

In carrying out the invention the free end of the hinged section is formed with a bifurcated lug 5 through which is adapted to be engaged by connecting bolt 6 arranged to extend through an opening formed in the trolley pole at its junction with the hinged section of the fork or harp, a fastening 7 being arranged to screw on the threaded end of the connecting bolt or member. As clearly shown in the drawing the opening through which the connecting bolt 6 extends is of gradually increasing size from one end to permit the headed portion 6 of the bolt to be readily disengaged from the bifurcated lug of the hinged bearing section after partly unscrewing the nut 7 and without removing the bolt from position.

By the above defined arrangement the free end of the hinged fork or harp section may be locked against displacement. The arms or side pieces 8 of said sections are formed in their inner faces and near their outer ends with centrally disposed sockets or recesses 9, in this instance shown of square form, said recesses being so arranged that those of the hinged section are adapted for registration with those of the fixed or other section. The numeral 10 indicates the axle on which the trolley wheel 11 is journaled. As shown, this axle comprises a cylindrical body portion 12 formed with two series of longitudinally spaced ports or apertures 13, one series being diametrically opposite the other series. A head 14 of square form is formed at one end of said body portion 12 of the axle and is adapted to closely fit in the recesses or sockets in adjacent arms of the harp or fork sections and adapted for screwed engagement with the opposite exteriorly threaded end of such body portion is a nut 15 also of square form to closely fit in the recesses or sockets in the adjacent arms of the harp or fork sections at the opposite side of the trolley pole. By the arrangement shown and above defined it will be seen that the axle may be readily and easily placed in or removed from position. The inner walls of the sockets or recesses 9 formed in the arms of the fixed and hinged sections are preferably recessed as at 16 to receive opposite ends of the body portion of the axle.

In carrying out the invention, the top of the body portion is formed with suitable channels or pockets 17 for conducting any of the lubricant that has worked to the top of the axle back into the body portion of the same through the apertures or ports 13.

In practice, when it is desirable to replenish the supply of oil or other lubricant contained in the hollow axle, it is only necessary to swing open the hinged section of the trolley fork or harp to permit of the removal of such axle and unscrew the nut 15 therefrom. By employing the arrangement illustrated it will be seen that any of the parts that have become sufficiently worn to render them useless may be readily replaced without undergoing the expense of replacing the entire bearing.

Having thus described our invention, what we claim as new and desire to secure by Letters-Patent, is:

A trolley wheel bearing comprising fixed and hinged sections, the free end of the hinged section being formed with a bifurcated lug and the fixed section with a transverse opening of gradually increasing size from one end to register with the bifurcation in said lug, a connecting bolt arranged to extend through the opening of the fixed section with its headed portion bearing upon the lug of the hinged section and a nut screwing upon the threaded portion of the bolt, the headed portion of the bolt being adapted to be disengaged with the lug of the hinged section without removing the bolt from position.

In testimony whereof we have hereunto set our hands in presence of two subscribing witnesses.

WILLIAM M. CASWELL.
JOSEPH A. SCHOFIELD.

Witnesses:
   JOHN E. WHEELER,
   WESLEY J. RICHARDS.